Nov. 20, 1923.
A. S. KESZTHELYI
TOOL JOINT
Filed Jan. 12, 1923
1,474,905
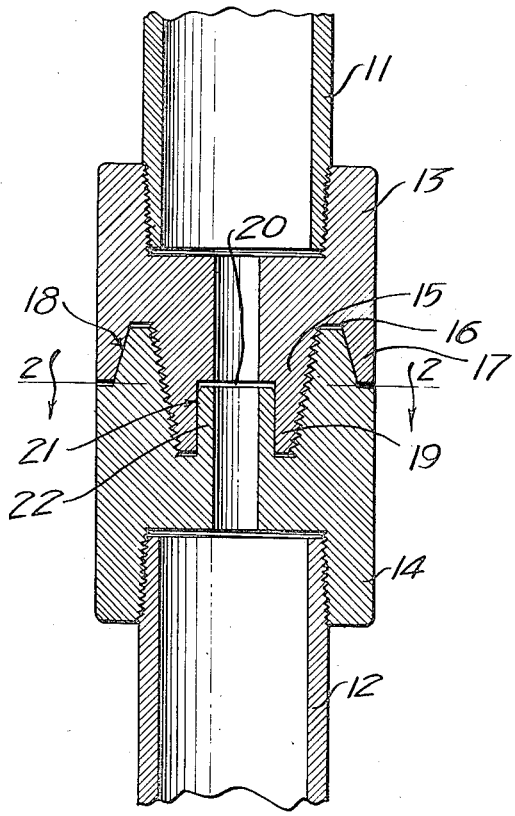
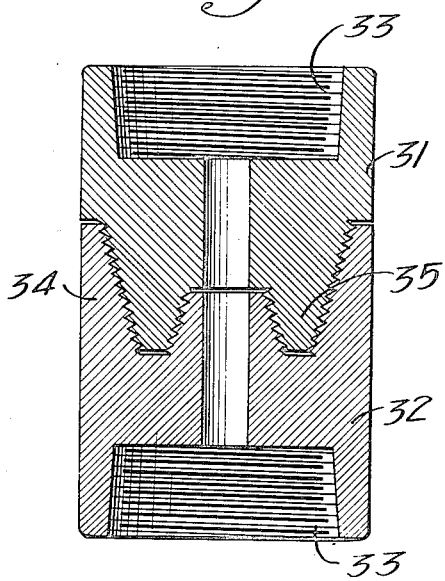
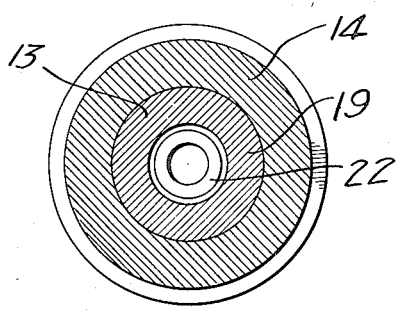
INVENTOR:
ALEXANDER S. KESZTHELYI,
BY
Graham + Hauri
ATTORNEYS.

Patented Nov. 20, 1923.

1,474,905

UNITED STATES PATENT OFFICE.

ALEXANDER S. KESZTHELYI, OF LOS ANGELES, CALIFORNIA.

TOOL JOINT.

Application filed January 12, 1923. Serial No. 612,295.

*To all whom it may concern:*

Be it known that I, ALEXANDER S. KESZTHELYI, a citizen of the United States, residing at Los Angeles, in the county of Los Angeles and State of California, have invented a new and useful Improvement in Tool Joints, of which the following is a specification.

My invention relates to tool joints such as are used in rotary drilling of oil wells. In the drilling of oil wells by the so called rotary system, it is common practice to rotate a string of drill pipe by suitable mechanism, this pipe carrying at its lower end the bit which by its action on the various formations encountered produces the hole. Whenever the bit has to be sharpened it is necessary to pull the drill pipe, uncoupling it at intervals. It is now common practice to build the derrick sufficiently high to take three or four lengths of drill pipe to a stand so that the pipe is unjointed only at every fourth joint as it is pulled from the wells, these stands being then stood on the floor of and inside the derrick as they are withdrawn and unjointed. Since the bit is necessarily often withdrawn, it is necessary to provide tool joints at every fourth joint to prevent the threads on the pipe from being injured by this frequent coupling and uncoupling.

Tool joints as commonly constructed and used consist of a pair of steel collars, each of which is adapted to be screwed on the end of an ordinary joint of pipe using the threads with which such pipe is ordinarily provided, one of these collars having a pipe with a steep taper and coarse threads and the other collar having a box into which this pin is threaded. These tool joints are used at each end of each stand of pipe, each stand usually consisting of four joints of pipe, the collar having the pipe being secured on one end and the collar with the box being secured on the other.

Since it is often disastrous to have a string of drill pipe part especially when being inserted or withdrawn, it is the common practice to set up these tool joints by the use of the power driven rotary table so that the friction on the threads between the box and the pin is very great and even when so set up it is not uncommon for the joints to become loose or even to become unscrewed.

It is an object of my invention to provide a novel form of tool joint in which the friction on the threads is not entirely depended upon to hold the joint together but supplemental frictional means are provided for this purpose.

In rotary drilling a stream of mud laden fluid, usually heavy clay in suspension in water, is used, the fluid being forced by heavy mud pumps down through the string of drill pipe and through the bit into the bottom of the hole flowing upwardly outside the pipe and serving to lubricate the hole and mud up the formations and support the walls. To make this system of mud circulation effective it is often necessary to apply considerable pressure to the upper end of the drill pipe and it is often a difficult matter using the present type of tool joint to insure tight joints at the ends of the stands at the tool joint pins. It is a further object of my invention to provide auxiliary means insuring a tight joint at all times.

Further objects and advantages will be made evident hereinafter.

Referring to the drawing which is for illustrative purposes only,

Fig. 1 is a cross section of the adjacent ends of two stands of pipe equipped with my invention.

Fig. 2 is a section on a plane indicated by the line 2—2 of Fig. 1.

Fig. 3 is a section through one alternate form of my invention and,

Fig. 4 is a similar section through another alternate form.

In the form shown in Fig. 1, 11 and 12 are the adjacent ends of two strings of drill pipe, the pipe 11 having a collar 13 and the pipe 12 having a collar 14 screwed thereon. Formed on the collar 13 is a projection 15 which is externally threaded with a coarse tapered thread as shown. Surrounding the projection 15 is a groove 16 and outside the groove is a shoulder or lip 17 which is provided with a conical opening. The collar 14 has an external conical surface 18 which is of proper taper and size to fit into the groove 16 inside the lip 17 as the joint is screwed home. The collar 14 is also provided with an internal threaded recess 19 into which the projection 15 may be threaded. Formed in the collar 13 surrounding a central opening 20 which extends therethrough there may be provided an enlarged opening 21 which is of proper size to receive a projection 22 extending upwardly, as shown, from the collar 14. The parts are so proportioned that when the collars are screwed home, there is still a little space therebetween on all surfaces which are at right angles to the axis of the pipe.

In this preferred form of my invention, it is possible to obtain a very tight joint between the collars 13 and 14 due to the tapered lip 17 which cooperates with its complementary part on the collar 14. This tapered surface not only acts to produce a tight joint independent of the threads between the parts, but it also tends to increase the friction between the two collars 14 and 13, thus preventing the joints from coming unscrewed and the attendant expensive fishing jobs that often result from such unscrewing. The central projection 22 also serves to insure a tight joint between the parts although this may in some cases be omitted and entire reliance placed on the conical surface 18. In the form of my invention shown in Fig. 3 I use two collars 31 and 32 which are threaded at 33 to receive the drill pipe, the collar 32 having an outer lip 34 which is internally threaded and an inner pin 35 which is externally threaded. These parts fit into complementary portions of the tool joint 31. The threads on the outer lip 34 and the inner pin 35 are simultaneously threaded by a combination special tool.

In the form of my invention shown in Fig. 4 I provide two collars 41 and 42 which are threaded at 44 to receive the drill pipe. The collar 41 has an external lip 46 and an internal pin 47. A connecting member 45 is threaded on both the lip and the pin and is in turn provided with an internal conical opening internally threaded to receive a threaded projection 50 on the collar 42. This form is a variation of the other forms shown, which was adopted by me for manufacturing reasons and which may be used to insure a very tight joint by making the threads on the collar 41 and its attendant portion of the member 48 of a slightly different pitch than the threads between the member 48 and the collar 42.

It is obvious that other forms might be devised that would embody my invention which I desire shall be defined solely by the annexed claims.

I claim as my invention:

1. A tool joint comprising: a primary collar adapted to be secured to a joint of pipe and having an opening therethrough, said opening being in open communication with the interior of said pipe; a secondary collar adapted to be secured to a joint of pipe and having an opening therethrough, said opening being in open communication with the interior of said pipe; a lip formed on the outer edge of said primary collar and enclosing a groove; a projecting portion of said secondary collar fitting inside said groove and inside said lip; and threaded means for forcing said collar towards each other in an axial direction.

2. A tool joint as in claim 1 in which the interior surface of said lip is conical and the projecting portion of said secondary collar fitting inside said conical surface is also coned to fit in fluid tight relationship therein.

3. A tool joint as in claim 1 in which the means for forcing said collars together comprises: a conical projection having an external thread and formed on one of said collars; and an internally threaded portion on the other collar into which said projection fits and is threaded.

4. A tool joint comprising: a primary collar adapted to be secured to a joint of pipe; a secondary collar adapted to be secured to a joint of pipe; a lip formed on the outer edge of said primary collar and enclosing a groove; a projecting portion of said secondary collar fitting inside said groove and inside said lip; a conical projection having an external thread and formed centrally on said primary collar; and an internally threaded portion on said secondary collar into which said projection fits and is threaded.

5. A tool joint comprising: a primary collar adapted to be secured to a joint of pipe and having an opening therethrough in open communication with the interior of said pipe; a secondary collar adapted to be secured to a joint of pipe and having an opening therethrough in open communication with the interior of said pipe and with the opening in said primary collar; a lip formed on the outer edge of said primary collar and enclosing a groove; a projecting portion of said secondary collar fitting inside said groove and inside said lip; a conical projection having an external thread and formed centrally on said primary collar; and an internally threaded portion on said secondary collar into which said projection fits and is threaded.

In testimony whereof, I have hereunto set my hand at Los Angeles, California, this 3rd day of January, 1923.

ALEXANDER S. KESZTHELYI.